Nov. 25, 1924.

D. J. McCORMACK

WATER TURBINE

Filed July 15, 1922

1,516,822

3 Sheets—Sheet 2

Inventor
Daniel J. McCormack
by
Thurston Know & Hudson
attys.

Nov. 25, 1924.
D. J. McCORMACK
WATER TURBINE
Filed July 15, 1922
1,516,822
3 Sheets-Sheet 3
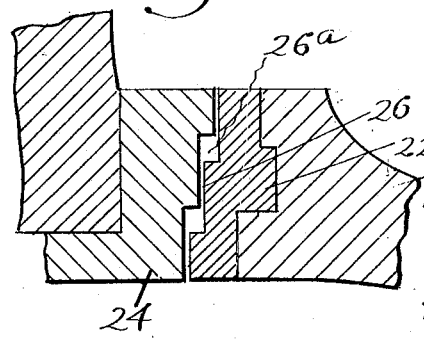
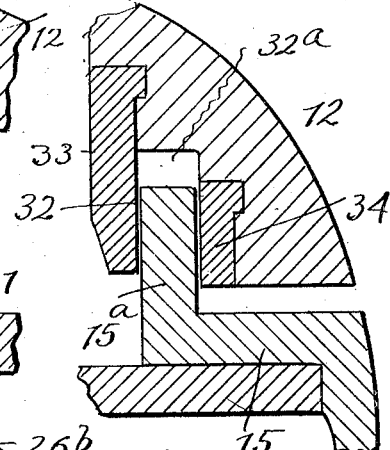
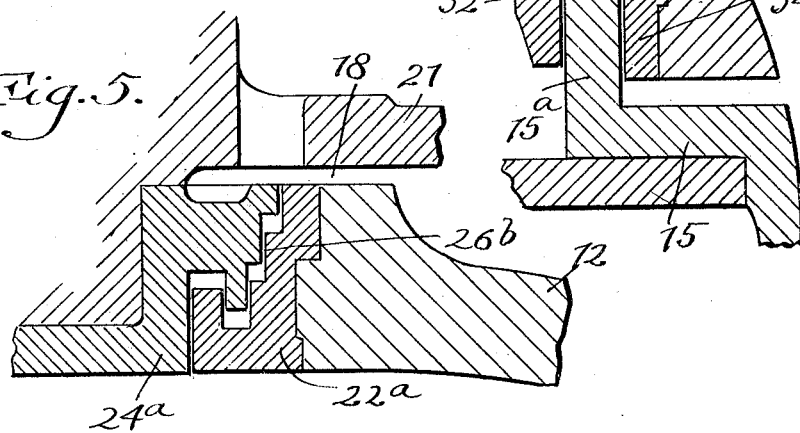
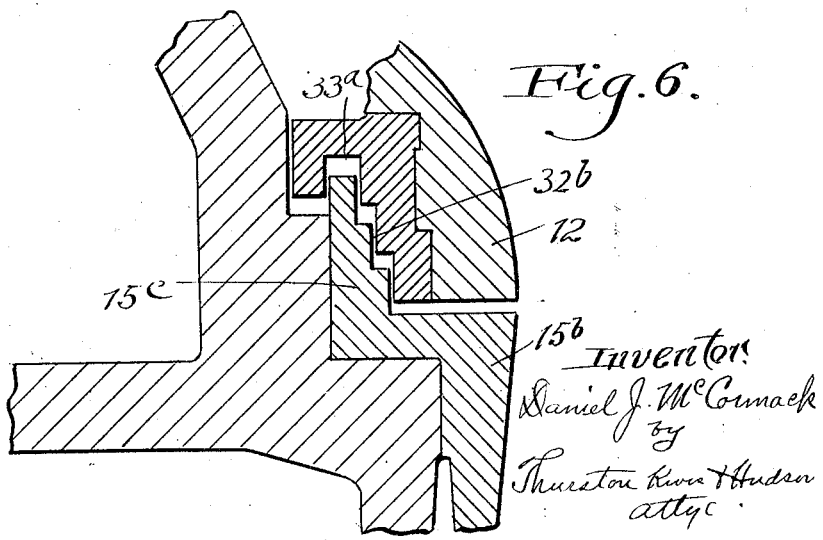
Inventor:
Daniel J. McCormack
by
Thurston Kwis & Hudson
attys Patented Nov. 25, 1924.

1,516,822

UNITED STATES PATENT OFFICE.

DANIEL J. McCORMACK, OF CLEVELAND, OHIO, ASSIGNOR, BY MESNE ASSIGNMENTS, TO NEWPORT NEWS SHIPBUILDING & DRY DOCK COMPANY, OF NEWPORT NEWS, VIRGINIA, A CORPORATION OF VIRGINIA.

WATER TURBINE.

Application filed July 15, 1922. Serial No. 575,144.

*To all whom it may concern:*

Be it known that I, DANIEL J. McCORMACK, a citizen of the United States, residing at Cleveland, in the county of Cuyahoga and State of Ohio, have invented a certain new and useful Improvement in Water Turbines, of which the following is a full, clear, and exact description.

This invention relates to certain improvements in water turbines, and has for its chief object to improve the efficiency of water turbines, first, by reducing leakage between the periphery of the runner and the associated walls of the housing in proximity with which the runner rotates, and secondly, by reducing the water pressure on top of the runner and building up pressure beneath the runner so as to reduce the load on the thrust bearing of the unit.

These results are attained by my invention in accordance with which so-called labyrinth seals are provided at designated points to baffle and check the flow of water therethrough under pressure, and by the provision at other designated points of relatively free passages, these being so arranged as to cause restricted flow to, but free flow from a chamber on top of the runner, and relatively free flow to, but restricted flow from a chamber beneath the runner.

The invention may be further briefly summarized as consisting in certain novel details of construction, and combinations and arrangements of parts which will be described in the specification and set forth in the appended claims.

Figure 1:
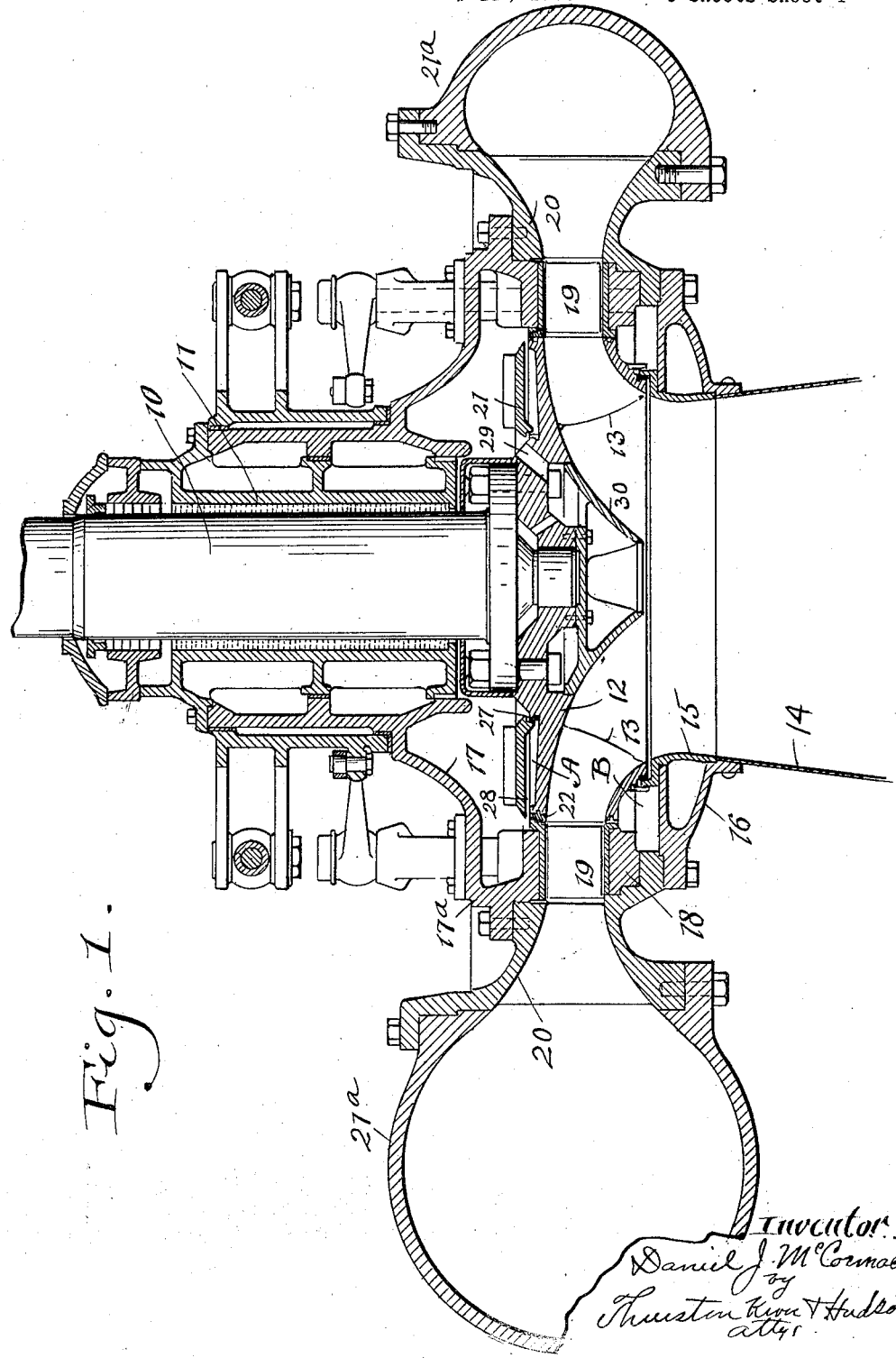
Figure 2:
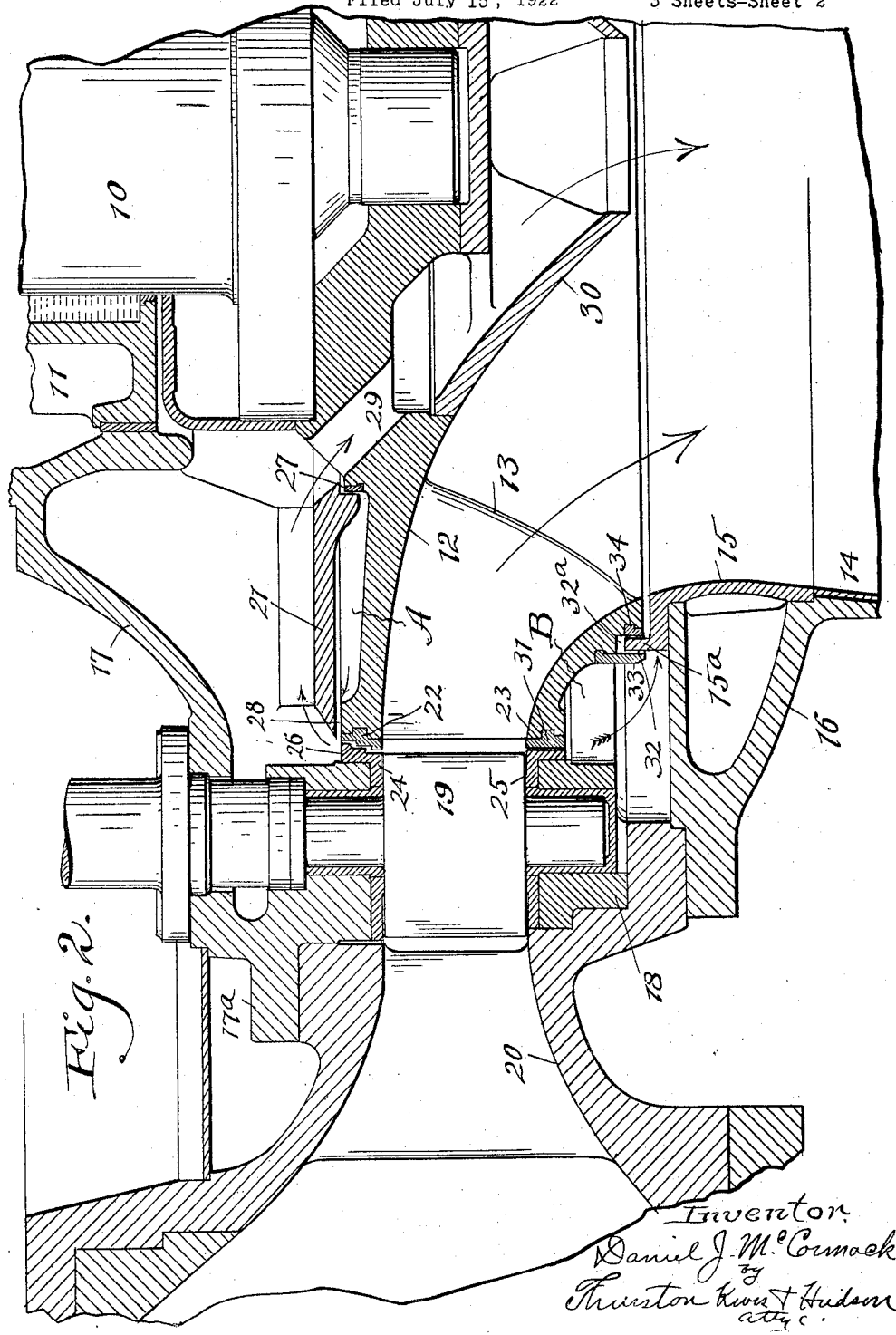

In the accompanying sheets of drawings wherein I have shown a turbine embodying my invention, Fig. 1 is a vertical sectional view through the turbine; Fig. 2 is a fragmentary vertical sectional view showing substantially one-half of the turbine on an enlarged scale; Figs. 3 and 4 are enlarged detail sectional views of labyrinth seals shown in Figs. 1 and 2; and Figs. 5 and 6 are similar views showing modifications of the same.

Referring now to the drawings, 10 represents the vertical shaft of the turbine, which as customary, is supported by a step bearing, not here shown, and journaled near the runner in bearings 11 with which the present invention is in no way involved.

Secured to the bottom of the shaft 10 is a runner 12 provided with the usual vanes 13 from which the water discharges into a draft tube 14, at the top of which is a wearing ring 15 fitted to a so-called draft tube ring 16.

Above the runner is the stationary crown plate 17 and supported by the outer portion 17ª thereof, just beyond the periphery of the runner, and supported also by the lower curb plate 18, are the gates 19 which may be operated in any suitable manner and are located in the customary way opposite the open periphery of the runner so as to control the passage of water from the vaned speed ring 20 forming the inner part of a spiral casing 21ª to which is led the water which operates the turbine.

It will be observed that above the runner there is a chamber A, located between the top of the runner and a stationary thrust ring 21 which is supported from, and may be regarded as a part of the crown plate 17. Likewise it will be observed that beneath the runner and between the latter and the draft tube ring 16 there is a chamber B. Obviously pressure in chamber A tends to increase the load on the thrust bearing, and pressure in chamber B has the opposite effect of decreasing the load on the bearing.

It will be seen, therefore, that it is important to minimize pressure in the upper chamber A and to build up or maintain pressure in the lower chamber B. Likewise it is important from the standpoint of efficiency, that leakage be reduced between the upper and lower peripheral walls of the runner and the walls of the contiguous stationary members. These important results are attained by my invention.

At the periphery of the top and bottom walls of the runner, i. e., above and below the outer edges of the vanes 13 annular wearing bands 22 and 23 are provided, these rotating in close proximity to upper and lower wearing plates 24 and 25 which are provided respectively immediately above and immediately below the gates 19 and engage respectively the lower surface of the crown plate 17 and upper surface of the curb plate 18. At the top of the runner, i. e., between the upper wearing band 22 and the adjacent face of the upper wearing plate 24 I provide what may be termed a labyrinth seal 26 which reduces to a minimum the pressure on top of the runner. This labyrinth seal is formed by a tortuous passageway, which as shown in Figs. 1, 2 and 3 is produced by a stepped formation between the contiguous surfaces with enlargements 26ª formed at intervals, so that the water in leaking through this seal not only has to suffer a sudden expansion on entering each of the enlargements 26ª, but also the several changes in direction causes a further loss or reduction in pressure, and further impedes the amount of leakage. A seal is further provided between the inner portion of the runner and the thrust ring at 27 but the major portion of the water in chamber A will pass out at the periphery of the runner at the gap marked 28 between the runner and the outer part of the thrust ring where the pressure produced by centrifugal force is the greatest, due to the water in chamber A revolving around with the runner. This labyrinth seal 26 thus reduces the pressure above the runner and minimizes leakage, and the water which passes through the labyrinth seal eventually passes over the thrust ring 21 and leaves the runner through cored passages 29 and passes out through the tip 30 of the runner into the draft tube in the manner indicated by the arrows.

At the lower outer part of the runner, i. e., between the lower wearing band 23 and wearing plate 25 a straight seal 31 is provided in order to allow some leakage into the chamber B to build up pressure on the bottom of the runner and thereby reduce the load on the thrust bearing as already stated.

At the outlet for this chamber, i. e., between the lower part of the runner and the wearing ring 15 a labyrinth seal which forms a tortuous passageway is provided, this seal serving to maintain pressure in chamber B. That is to say, the inlet to the chamber is relatively free, but the outlet is relatively restricted. The seal 32 is as shown in Figs. 1, 2 and 4, formed by an upstanding flange 15ª on the wearing strip 15, which flange enters the annular space between two wearing bands 33 and 34 carried by the lower part of the runner. Any water leaking through this seal expands and eddies in an enlargement 32ª and its course is changed in passing through the seal as with the labyrinth seal 26.

The labyrinth seals shown at 26 and 32 may be formed as illustrated in Figs. 3 and 4, and in the main views, but they may if desired be made still more tortuous, as illustrated, for example, in Figs. 5 and 6, wherein the labyrinth seals are designated 26ᵇ and 32ᵇ. The seal shown in Fig. 5 corresponds to and may be used in place of the seal shown in Fig. 3. In Fig. 5 the wearing band 22ª of the runner and stationary wearing plate 24ª correspond to the band 22 and plate 24 of Fig. 3. The seal shown in Fig. 6 corresponds to, and may be used in place of the seal shown in Fig. 4. In Fig. 6 the stationary wearing ring 15ᵇ corresponds to the ring 15 of Fig. 4 and it is provided with a stepped flange 15ᶜ extending up into a recessed and stepped wearing band 33ª carried by the runner and corresponding to the wearing rings 33 and 34 of Fig. 3. Water leaking through any of the labyrinth seals shown is required to change its course and undergoes expansion at intervals, causing eddying, both the change in course and the eddying being factors in impeding leakage or in reducing the coefficient of discharge. Furthermore, it is to be noted that the seals are formed between the rotating and stationary parts in a manner such that there may be a limited vertical movement of the runner in case the babbitted face of the thrust bearing should burn out, in which event the runner would not grind on the wearing rings or plates.

Thus it will be seen that with the construction above described, the results stated at the beginning of the specification are attained very effectively.

While I have shown a certain construction which answers requirements, I do not desire to be confined to the exact details shown, but aim in my claims to cover all modifications which do not involve a departure from the spirit and scope of my invention as defined in the appended claims.

Having described my invention, I claim:

1. In a water turbine, a runner, a stationary part within which the periphery of the runner rotates, a chamber above the runner, said chamber having a relatively free outlet for the water and having a tortuous passageway or labyrinth seal constituting its inlet and located between the upper part of the runner and the associated stationary part, said parts and passageways being constructed and arranged to cause the pressure above the runner to be materially less than below the same.

2. In a water turbine, a runner, a stationary part in proximity to which the periphery of the runner rotates, a chamber formed in the stationary part beneath the runner, said chamber having a restricted water outlet and having a relatively free inlet between the peripheral part of the runner and the associated stationary part.

3. In a water turbine, a runner, a housing enclosing the runner and having annular surfaces in proximity to which the peripheral part of the runner rotates, water seals at the upper and lower portions of the runner, the seal at one point being relatively restricted, and the seal at another being relatively unrestricted.

4. In a water turbine, a runner, a stationary part for delivering water to the periphery of the runner, and having portions in proximity to which the runner rotates, upper and lower seals at the periphery of the runner, and upper and lower chambers above and beneath the runner respectively, the seal leading to the upper chamber being tortuous, and the seal leading to the lower chamber being relatively free, and the upper chamber having outlets for the free delivery of water, and the lower chamber having a restricted outlet formed by the runner and an associated stationary part.

5. In a water turbine, a runner, a stationary part within which the runner rotates, chambers located on opposite sides of the runner, and means for maintaining a higher pressure in one chamber than the other.

6. In a water turbine, a casing, a runner, water chambers located above and below the runner, and means for causing a greater pressure to be maintained in the lower chamber than in the upper chamber.

7. In a water turbine of the vertical type, a casing, a runner, water chambers located above and below the runner, and means whereby a relatively low pressure is maintained in the upper chamber and a relatively high pressure is maintained in the lower chamber.

8. In a water turbine, a runner, a casing within which the runner rotates, and clearance spaces between the runner and casing such that leakage through one space is relatively restricted and leakage through the other is relatively free.

9. In a water turbine, a runner, a casing within which the runner rotates, chambers on opposite sides of the runner, and clearance spaces between the runner and casing and communicating with the two chambers, said clearance spaces being such that the leakage to one chamber is relatively free and that to the other is relatively restricted.

10. In a water turbine, a runner, a casing within which the runner rotates, chambers on opposite sides of the runner and adapted to receive leakage water from within the casing, and means whereby a greater pressure is maintained in one chamber than in the other.

11. A water turbine of the vertical type, a runner, a casing within which the runner rotates, chambers above and below the runner adapted to receive leakage water from within the casing, and means whereby a greater pressure is maintained in the lower chamber than in the upper.

In testimony whereof, I hereunto affix my signature.

DANIEL J. McCORMACK.